United States Patent [19]

Copeland et al.

[11] Patent Number: 5,163,752
[45] Date of Patent: Nov. 17, 1992

[54] FLASHLIGHT HOLDER APPARATUS

[76] Inventors: Debra L. Copeland; Charlie W. Hardison, both of R.D. 2, Box 193, McDermott, Ohio 45652

[21] Appl. No.: 835,311

[22] Filed: Feb. 14, 1992

[51] Int. Cl.⁵ .............................................. F21V 21/00
[52] U.S. Cl. ..................................... 362/396; 362/32; 362/191
[58] Field of Search ........................ 362/32, 103–105, 362/191, 430, 395, 396, 190

[56] References Cited

U.S. PATENT DOCUMENTS

| | | | |
|---|---|---|---|
| 2,524,173 | 10/1950 | Peterson | 362/396 |
| 3,582,638 | 6/1971 | Peters | 362/32 |
| 3,590,232 | 6/1971 | Sadowski | 362/32 |
| 3,644,725 | 2/1972 | Lochridge | 362/32 |
| 3,992,618 | 11/1976 | Matthews et al. | 362/396 |
| 4,348,716 | 9/1982 | Storm et al. | 362/191 |
| 5,086,378 | 2/1992 | Prince | 362/32 |

Primary Examiner—James C. Yeung
Attorney, Agent, or Firm—Leon Gilden

[57] ABSTRACT

A holder includes a "C" shaped clamp member arranged to secure an articulated elongate positioning tube, wherein the positioning tube is fixedly received within a mounting plate that in turn secures a flashlight member thereto. In a modification, a fiber optic cable including a first end and a second end includes a suction cup member receiving the second end coaxially thereof permitting securement of the suction cup to the flashlight lens providing for illumination within limited geometric confinements.

2 Claims, 4 Drawing Sheets

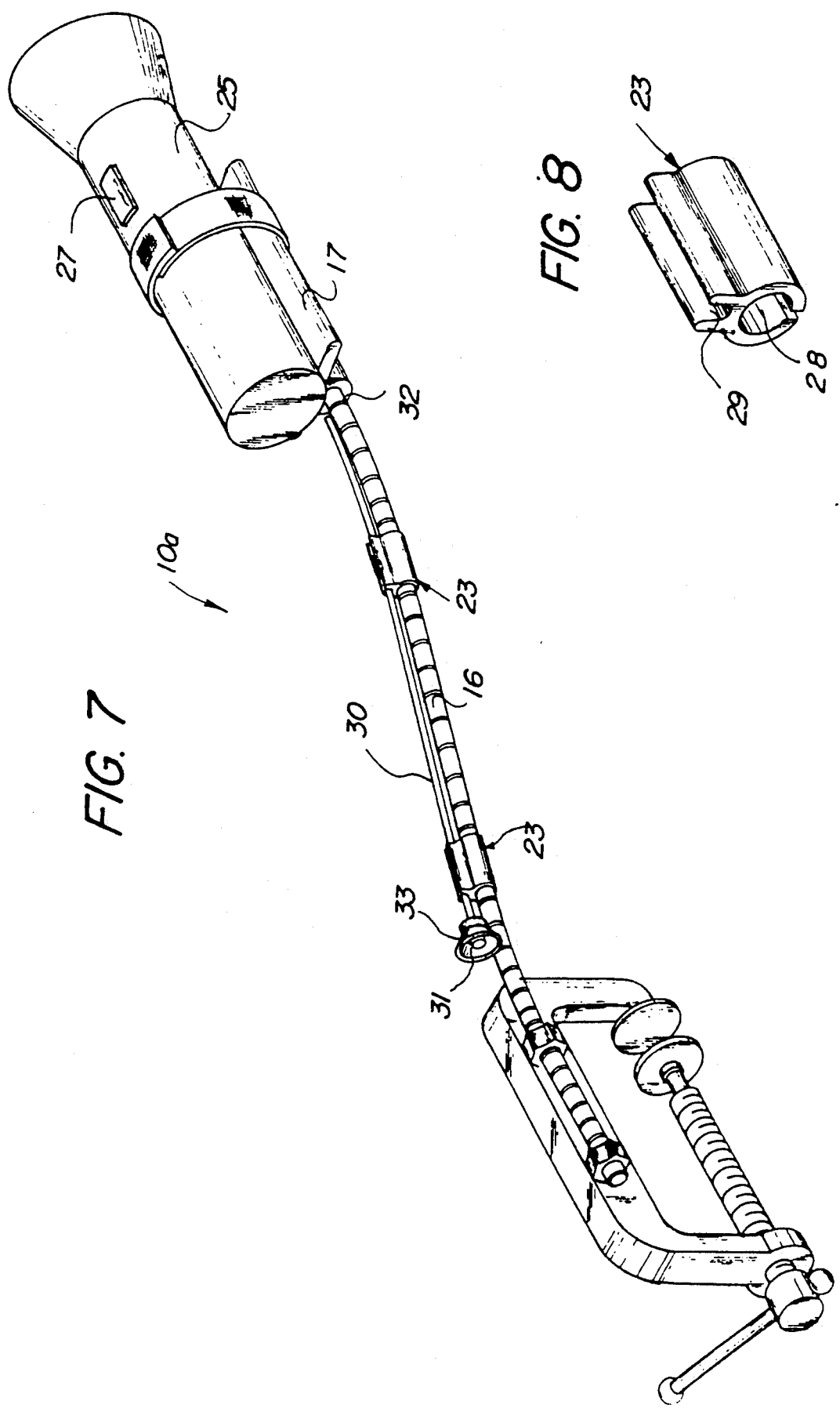

FLASHLIGHT HOLDER APPARATUS

BACKGROUND OF THE INVENTION

1. Field of the Invention

The field of invention relates to illumination apparatus, and more particularly pertains to a new and improved flashlight holder apparatus wherein the same is arranged to secure a flashlight relative to a work site for providing selective illumination thereto.

2. Description of the Prior Art

Flashlight holder apparatus has been set forth in the prior art to position a flashlight at a predetermined orientation. Such apparatus is set forth and exemplified in U.S. Pat. No. 4,058,719 to Chopp wherein a flashlight holder includes a base member formed with a plurality of rigid spaced ribs and rod members mounted to the base for positioning a flashlight therewithin.

The prior art has heretofore, however, failed to provide for an articulated rod assemblage permitting ease of orientation of a flashlight member for providing selective illumination and in this respect, the present invention substantially fulfills this need.

SUMMARY OF THE INVENTION

In view of the foregoing disadvantages inherent in the known types of flashlight holder apparatus now present in the prior art, the present invention provides a flashlight holder apparatus wherein the same positions a flashlight to a mounting plate permitting articulated positioning of the flashlight relative to a work site. As such, the general purpose of the present invention, which will be described subsequently in greater detail, is to provide a new and improved flashlight holder apparatus which has all the advantages of the prior art flashlight holder apparatus and none of the disadvantages.

To attain this, the present invention provides a holder including a "C" shaped clamp member arranged to secure an articulated elongate positioning tube, wherein the positioning tube is fixedly received within a mounting plate that in turn secures a flashlight member thereto. In a modification, a fiber optic cable including a first end and a second end includes a suction cup member receiving the second end coaxially thereof permitting securement of the suction cup to the flashlight lens providing for illumination within limited geometric confinements.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved flashlight holder apparatus which has all the advantages of the prior art flashlight holder apparatus and none of the disadvantages.

It is another object of the present invention to provide a new and improved flashlight holder apparatus which may be easily and efficiently manufactured and marketed.

It is a further object of the present invention to provide a new and improved flashlight holder apparatus which is of a durable and reliable construction.

An even further object of the present invention is to provide a new and improved flashlight holder apparatus which is susceptible of a low cost of manufacture with regard to both materials and labor, and which accordingly is then susceptible of low prices of sale to the consuming public, thereby making such flashlight holder apparatus economically available to the buying public.

Still yet another object of the present invention is to provide a new and improved flashlight holder apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an isometric illustration of a modification of the invention.

FIG. 8 is an isometric view of the clip structure.

DESCRIPTION OF THE PREFERRED EMBODIMENT

Figure 1:
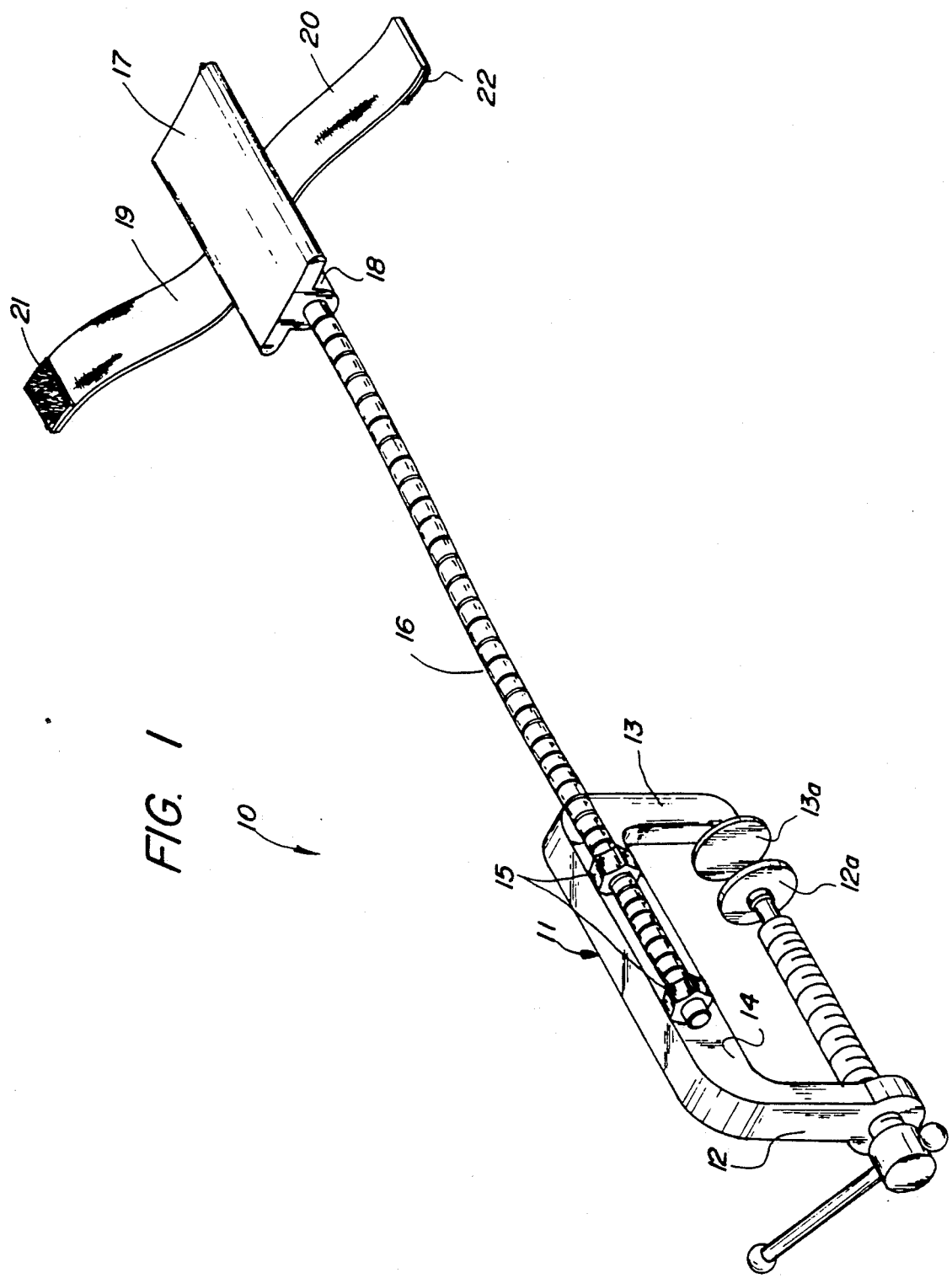
FIG. 1 is an isometric illustration of the instant invention.
Figure 2:
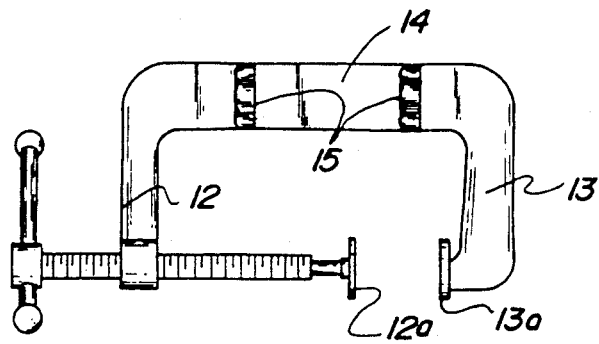
FIG. 2 is an orthographic side view of the clamp structure.
Figure 3:
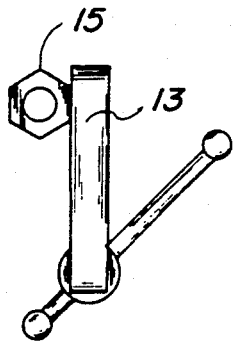
FIG. 3 is an orthographic end view of the clamp structure.
Figure 4:
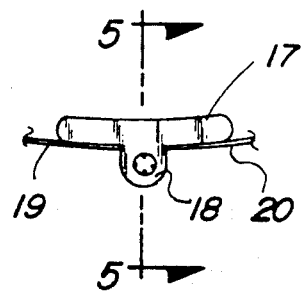
FIG. 4 is an orthographic end view of the mounting plate.
Figure 5:
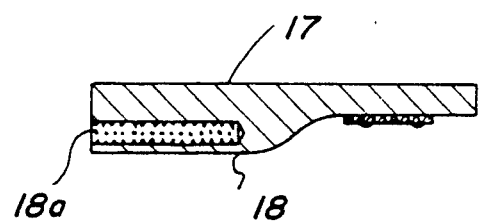
FIG. 5 is an orthographic view, taken along the lines 5—5 of FIG. 4 in the direction indicated by the arrows.
Figure 6:
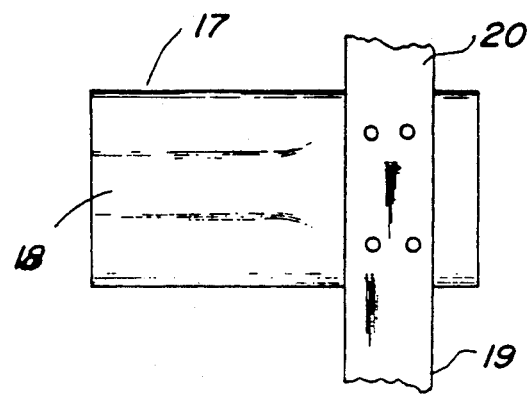
FIG. 6 is an orthographic bottom view of the mounting plate.

With reference now to the drawings, and in particular to FIGS. 1 to 10 thereof, a new and improved flashlight holder apparatus embodying the principles and concepts of the present invention and generally designated by the reference numerals 10 and 10a will be described.

More specifically, the flashlight holder apparatus 10 of the instant invention essentially comprises a "C" shaped clamp member 11 that includes a first leg 12 spaced from and parallel a second leg 13, with each leg orthogonally mounted to each distal end of a base web 14. The first leg 12 includes removable jaw plate 12a coaxially aligned relative to a fixed jaw plate 13a mounted to respective first and second legs 12 and 13 to secure a support base therebetween, such as exemplified in the FIG. 9. Mounting lugs 15 are mounted in a spaced coaxially aligned relationship relative to the base web 14, wherein the mounting lugs 15 fixedly secure a deformable articulated positioning tube 16 to the base web. The positioning tube 16 is formed of a series of spaced joints permitting articulation of the positioning tube in use. A forward distal end of the positioning tube 16 spaced from the clamp member 11 is received within a mounting plate boss 18 integrally mounted to a bottom surface of a mounting plate 17. A boss socket 18a receives a forward distal end of the positioning tube 16 fixedly therewithin. The mounting plate 17 includes a strap member projecting orthogonally beyond opposed lateral sides of the mounting plate 17 defining respective first and second strap portions 19 and 20 extending orthogonally beyond the spaced respective lateral sides of the mounting plate. The first and second strap portions 19 and 20 include respective first and second loop fastener patches 21 and 22 securable together to surroundingly secure a flashlight body 25 to the mounting plate. The flashlight body 25 as illustrated in the FIGS. 7 and 9 for example includes the flashlight body 25 formed with a lens 26 at a forward distal end thereof for effecting selective illumination through the lens by use of a flashlight switch 27. In this manner, articulation of the flashlight body and orientation of the illumination lens as required is available to an individual requiring selective illumination relative to a work site, as illustrated in the FIG. 9.

Figure 9:
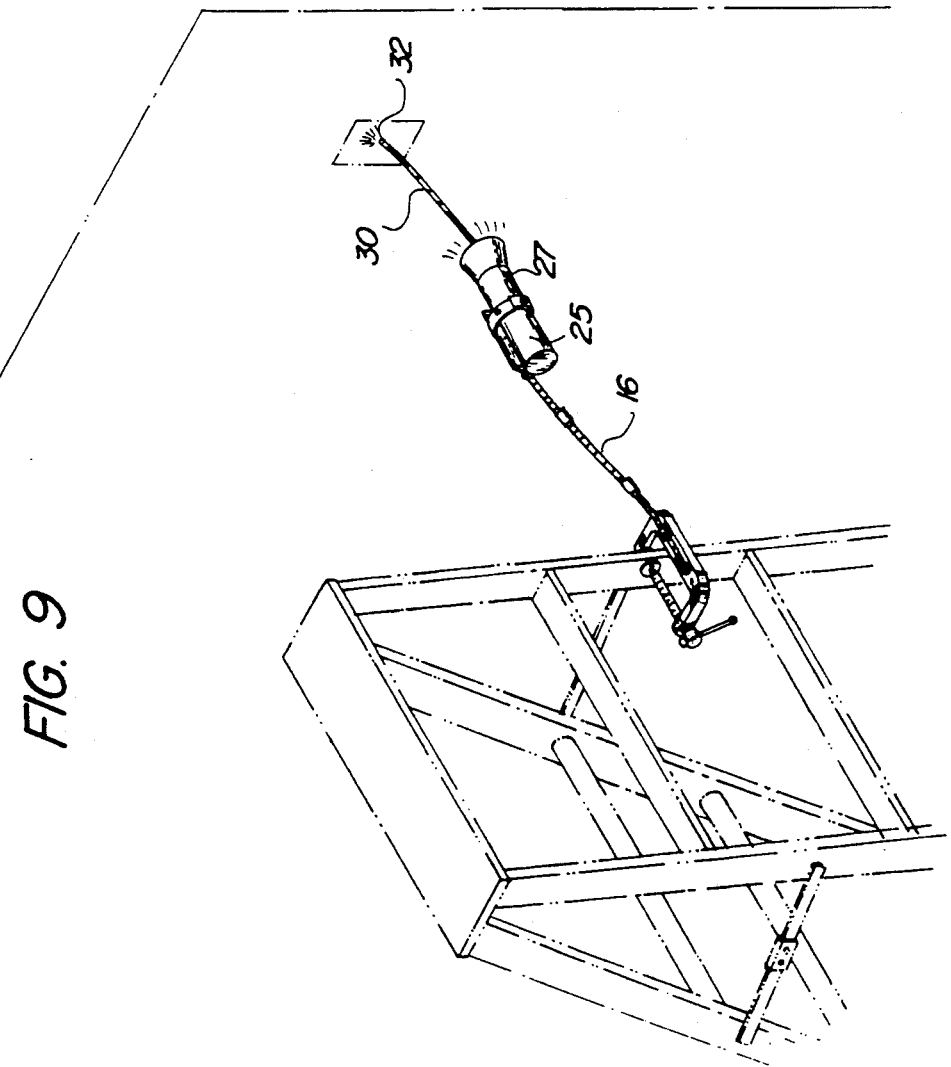
FIG. 9 is an isometric illustration of a modified invention in use.
Figure 10:
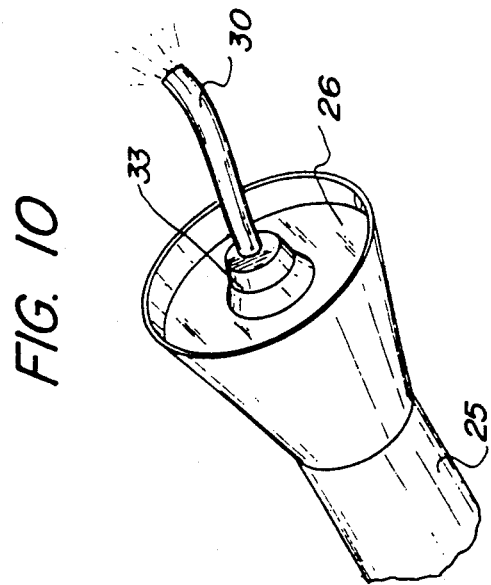
FIG. 10 is an enlarged isometric illustration setting forth mounting of the fiber optic cable to the flashlight lens.

The FIG. 7 illustrates a modified apparatus 10a that is arranged with the positioning tube 16 to include a plurality of spaced resilient clips 23. The resilient clips 23 each include a first discontinuous shell wall 28 defined by a first diameter to receive and engage the positioning tube 16. A second discontinuous shell wall 29 parallel to and coextensive with the first shell wall 28 is formed within the clip 23, wherein the spaced second shell walls 29 of the spaced resilient clips 23 secure a fiber optic cable 30 therewithin. The fiber optic cable 30 includes a cable first end 31 spaced from a cable second end. The cable first end 31 is coaxially directed through a suction cup 33. In this manner (see FIG. 10), the suction cup is secured to the flashlight lens 26 to direct illumination through the fiber optic cable 30 to provide for simultaneous illumination from the lens 26 and permit selective orientation of the cable second end 32 into a limited area, such as illustrated in FIG. 9, to provide for pinpoint illumination as required.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A flashlight holder apparatus, comprising, a clamp member, the clamp member including a first leg spaced from and parallel a second leg, and a base web, the first leg and the second leg orthogonally and integrally mounted to opposed distal ends of the base web, and the first leg including a movable jaw plate directed therethrough, the second leg including a fixed jaw plate secured thereto, wherein the movable jaw plate and the fixed jaw plate are coaxially aligned relative to one another for securement to a support base, and a deformable articulated positioning tube, the positioning tube including a tube first end and a tube second end, the tube first end fixedly mounted to the base web, and a mounting plate, the mounting plate including a mounting plate boss integrally mounted to a bottom surface of the mounting plate, with the mounting plate boss including a socket, wherein the tube second end is fixedly received within the boss socket, and a flashlight member, the flashlight member including a flashlight body, and a flashlight lens at a forward distal end of the body, with the securement means arranged for securement of the flashlight body to the mounting plate, and the securement means includes a strap member, with the strap member including a first portion orthogonally projecting beyond a first side of the mounting plate, and a second portion extending orthogonally beyond a second side of the mounting plate, wherein the first portion includes a first hook and loop fastener patch, the second portion includes a second hook and loop fastener patch for securement of the first portion and the second portion in surrounding relationship relative to the flashlight body, and a plurality of resilient clips secured to the positioning tube, and the resilient clips each including a first discontinuous shell wall defined by a first diameter secured about the positioning tube, and each of the clips including a second discontinuous shell wall arranged parallel to and coextensive with the first shell wall, and a fiber optic cable, the fiber optic cable including a first end and a second end, the fiber optic cable secured into each second shell wall of each clip between the first end and the second end, and a suction cup member, the suction cup member coaxially receiving the first end of the fiber optic cable therethrough permitting securement of the suction cup to the flashlight lens for directing illumination through the fiber optic cable second end.

2. An apparatus as set forth in claim 1 wherein the positioning tube includes a plurality of spaced movable joints, with the joints arranged coextensively with the positioning tube.

* * * * *